United States Patent [19]

Schneider et al.

[11] Patent Number: 5,259,863
[45] Date of Patent: Nov. 9, 1993

[54] METHOD AND APPARATUS FOR THE INCINERATION OF GARBAGE AND REFUSE

[75] Inventors: Deitmar Schneider, Düsseldorf; Klaus Horch, Kempen, both of Fed. Rep. of Germany

[73] Assignee: Deutsche Babcock Anlagen GmbH, Krefeld, Fed. Rep. of Germany

[21] Appl. No.: 887,743

[22] Filed: May 22, 1992

[30] Foreign Application Priority Data

May 28, 1991 [DE] Fed. Rep. of Germany ....... 4117444
Mar. 21, 1992 [EP] European Pat. Off. ........... 92104947

[51] Int. Cl.$^5$ ..................... C22B 9/00; C22B 9/187
[52] U.S. Cl. .................................. 75/414; 75/433;
  75/961; 75/10.35; 266/157; 110/216
[58] Field of Search ............. 75/414, 961, 958, 10.35;
  266/157, 900; 110/216, 234

[56] References Cited

U.S. PATENT DOCUMENTS

| | | |
|---|---|---|
| 4,353,713 | 10/1982 | Cheng .................... 48/202 |
| 4,448,588 | 5/1984 | Cheng . |
| 4,597,771 | 7/1986 | Cheng . |
| 4,823,740 | 4/1989 | Ohshita et al. ........... 122/4 D |
| 4,831,943 | 5/1989 | Aune .................... 110/216 |
| 4,977,837 | 12/1990 | Roos et al. ............ 110/216 |
| 5,022,329 | 6/1991 | Rackley et al. ........ 110/234 |

FOREIGN PATENT DOCUMENTS

| | | |
|---|---|---|
| 0241635 | 10/1987 | European Pat. Off. . |
| 00340644 | 4/1989 | European Pat. Off. . |
| 2721932 | 2/1979 | Fed. Rep. of Germany . |
| 3320466C2 | 4/1987 | Fed. Rep. of Germany . |
| 3815632A1 | 5/1988 | Fed. Rep. of Germany . |
| 3703984 | 8/1988 | Fed. Rep. of Germany . |
| 3716231 | 12/1988 | Fed. Rep. of Germany . |
| 3728487A1 | 3/1989 | Fed. Rep. of Germany . |
| 3939089A1 | 5/1991 | Fed. Rep. of Germany . |
| 3939344A1 | 6/1991 | Fed. Rep. of Germany . |
| WO 90/03856 | 4/1990 | World Int. Prop. O. . |

OTHER PUBLICATIONS

H. Ruegg "Schlackenschmelzanlage", Thome-Kozmiensky, K. J. (Hsrg.) Recycling Berlin '79, vol. 1, EF-Verlag, Berlin 1979, pp. 571–574.

Primary Examiner—Melvyn J. Andrews
Attorney, Agent, or Firm—Herbert Dubno

[57] ABSTRACT

A garbage incinerator is provided with a system for collecting the grate ash, the boiler ash and the fly ash resulting from the incineration and the collected residue is fed to a melting furnace from which the metal and metal compounds are recovered in the form of a metal-enriched melt and a slag which can be granulated and used in highway construction or the like since it is completely glassy. The metal-enriched melt can also be treated to recover metals therefrom.

19 Claims, 4 Drawing Sheets

METHOD AND APPARATUS FOR THE INCINERATION OF GARBAGE AND REFUSE

FIELD OF THE INVENTION

Our present invention relates to a method of and to an apparatus for the incineration of garbage and, more particularly, to a method of operating an incinerator or a method of treating the residues from garbage or refuse incineration, to the incinerator and the remainder of the plant with which it is employed and to a method of incineration or waste processing.

BACKGROUND OF THE INVENTION

In the incineration of garbage, the solid residues which are formed include so-called grate ash, namely, the materials which are cast off traveling grates or materials which pass through traveling grates or stationary grates and thus are collected below or downstream of the combustion grate, boiler ash which is generally collected from the flue gas passages, and filter dusts which are recovered from flue gas cleaning and can include the fly ash.

These residues include noncombusted carbon, soluble metals and their compounds and halogenated hydrocarbons like dioxins, furanes and precursors thereof, all of which are detrimental to the solid residues and can contribute to the inability to dispose of them in a safe, sanitary and environmentally sound manner.

The proportion of such undesirable components is less in the case of grate ash than for both of the other two residues and decreases with decreasing particle size diameter of the residues.

The use of grate ash in highway or road construction has been proposed. Fly ash filter dust, however, have been disposed of in landfills because they are less useful as components of structural materials or in highway construction. Before such landfill disposal, however, the products must be treated to reduce the content of noxious or toxic components or leachable substances.

The various methods of treating fly ash, for example, include a thermal treatment with oxygen deficiency to break down the halogenated hydrocarbons (DE-OS 37 03 984) and the so-called 3R process in which the fly ash is treated together with scrubbing water from a flue gas scrubber to decompose metal compounds and enable the scrubbed fly ash to be fed back to the combustion chamber (see DE-OS 33 20 466).

Various melting processes are known. For example DE-OS 37 16 231 describes a process in which the fly ash is melted with a plasma burner to eliminate metals and toxic hydrocarbons.

Boiler ash is usually withdrawn from the grate ash but poses a problem because of its much smaller particle size.

In EP-A 2 241 635, the treatment of grate ash is described in which a fine fraction (particle size less than 0.8 mm) is separated out and the coarse fraction is reused. The reprocessing and disposal of grate ash and optionally boiler ash has created resistance in the field because of the presence of toxic substances which are water soluble. In some cases such disposal has been made illegal and in other cases environmental activists have increasingly resisted the disposal processes.

The process and an apparatus for the treatment of so-called slag (grate ash) and so-called fly ash (boiler ash and filter dust) has been described by H. Ruegg in (Thomé-Kozmiensky, K. J. (Hrsg.) Recycling Berlin '79, Band 1, EF-Verlag, Berlin 1979, P. 571-574. In this case, the slag cascades from a grate of a refuse-burning plant directly into a melting chamber in which it is melted by heat produced by oil burners supplied with air. The liquefied slag flows into a water bath. The fly ash can be melted in a combustion chamber with a burner and the molten fly ash can also be fed to a water bath. The flue gas is fed to the combustion chamber.

The combustion chamber, the melting chamber and the water bath of this slag-melting apparatus is open to the fire box of the boiler and, as a consequence, the burner supplied energy is contributed with a low operating efficiency.

It is also a drawback of this system that the residence time of the residue in the melt space cannot be easily controlled. Reliable melting of the residues, complete destruction of the halogenated hydrocarbons and elimination of all of the toxic and noxious substances also cannot be guaranteed by this process.

From WO 90/03856, another process for the treatment of slags and other combustion residues from garbage incineration is known and uses separate melting furnaces. The slag and other combustion residues are heated in a preheating device and fed to the melting furnace. From the melting furnace, the slag is fed to a cooling device.

In a separate melting furnace, the residence time of the residues in the melt of bath can be better controlled and the decomposition of halogenated hydrocarbons and the complete combustion of unburned carbon can be guaranteed or made more reliable. In this system, however, only the metals with higher vapor pressure which evaporate during the melting operation and which are entrained with the waste gas from the furnace can be fully removed from the residues. Residual metal remains and, depending upon its melting point and on the residence time, can appear in liquid or solid form in the melt and poses a detriment to the product withdrawn from the melting furnace.

Reference may also be made to U.S. Pat. Nos. 4,353,713, 4,448,588 and 4,597,771, which deal with the processing of gases, solid municipal wastes and the like.

OBJECTS OF THE INVENTION

It is the principal object of the present invention to provide an improved process for treating the residues of a garbage incinerator so that the products obtained will have greater value and will be free from toxic or noxious substances.

Another object of the invention is to provide an improved method of operating an incinerator whereby the disposal of any products resulting from the treatment can be free from the drawbacks outlined above.

It is also an object of the invention to provide an improved apparatus for the incineration of garbage, refuse and, generally, municipal and household waste, which has improved energy efficiency, is simple by comparison with earlier apparatus, and which gives rise to products which are less environmentally hazardous and more useful than earlier incineration plants.

SUMMARY OF THE INVENTION

These objects are attained, in accordance with the invention, in a method of operating a garbage and refuse incinerator which comprises the steps of:

(a) incinerating garbage to produce a grate ash, a boiler ash and fly ash;

(b) recovering the fly ash from a flue gas from incineration of the garbage in step (a);

(c) collecting the grate ash and the boiler ash from the incineration in step (a) and the fly ash from the recovery from the flue gas in step (b);

(d) melting mixed residues including the collected grate ash, boiler ash and fly ash of step (c) in a melting furnace by supplying energy thereto, thereby forming a metal-enriched melt in the furnace and a residual melt therein; and (e) separately withdrawing the residual melt and the metal-enriched melt from the furnace and cooling same.

The incinerator plant can comprise:

a boiler supplied with garbage to be incinerated and producing a flue gas entraining fly ash, grate ash and boiler ash;

flue-gas cleaning means connected to the boiler, receiving the flue gas from the boiler and recovering fly ash from the flue gas;

means for collecting mixed residues including the grate ash and the boiler ash from the boiler and the fly ash from the flue-gas cleaning means; and a furnace separate from the boiler and the means for collecting, but connected to the means for collecting, for melting the mixed residues, thereby forming a metal-enriched melt in the furnace and a residual melt in the furnace, the furnace being provided with an outlet for discharging the metal-enriched melt and an opening for discharging the residual melt.

In the method of the present invention, the residues of a garbage incinerator, like the grate ash, optionally after separating it by size, the boiler ash and the filter dust, including fly ash and optionally also laden adsorbents are collected, for example, at the end of the flue gas cleaning chain on a filter bed or fabric filter, together with other residues like, for example, ash from a sewage sludge incinerator or pyrolysis plant. The collected residues are fed collectively to a separate melting furnace in which they are continuously melted with the supply of energy. From this melting furnace, we withdraw separately a metal-enriched melt and a residual melt, each of which is cooled. The flue gas of the melting furnace is supplied to the flue gas from the incinerator upstream of the flue gas cleaning plant, preferably in the fire box or combustion chamber of the incinerator.

An important advantage of the process of the invention is that the residual melt is a completely glassy slag which is free from unburned carbon, halogenated hydrocarbons and metal and metal compounds, at least to a major extent.

Any residual contaminants are bound in the glassy matrix of the slag when the latter is cooled and the glassy slag can be reused or deposited in mineral strata or landfills without detriment.

The metal-enriched slag which is withdrawn can be also subjected to processing to recover metal therefrom. Thus in the treatment of the residues according to the invention, only the glassy slag and the metal-enriched slag are obtained and both are valuable.

According to a feature of the invention, the metal-enriched melt is tapped from the bottom of the melting furnace while the residual melt is withdrawn from an opening in the side wall of the melting furnace at the level of the interface between the metal-enriched bath and the overlying slag melt. The metals which, because of their greater specific gravity collect on the bottom of the furnace can thus be separated from the residual melt in a simple manner. The metal-enriched melt is withdrawn intermittently while the residual melt is continuously withdrawn. A discontinuity of withdrawal enables the tapping hole to be a relatively large opening without, nevertheless, permitting the larger nonmolten metal pieces from passing therethrough.

The residues can, where the bath is maintained at 1100° to 1500° C. and the temperature above the bath is 100° to 300° C. higher, be readily melted with assurance of decomposition of halogenated hydrocarbons.

The upper part of the furnace can reach temperatures up to 1700° C. to allow the development of a glassy material above the metal-enriched melt. Under these conditions, any sulfur is readily driven off and, upon the flue-gas cleaning, is recovered in the form of gypsum, especially where waste gases are fed back to the fire box of the incinerator. Chlorine is also driven out of the melt and is removed by scrubbing. The glassy slag is thus free from both sulfur and chlorine.

Additional heating of the underpart of the melting furnace can be effected by, for example, electrodes introduced therein for electrical heating and 2 to 10% (and optionally up to 20%) of the energy required by the furnace can be introduced here. This ensures a uniform and reliable melting since the heat reaches deeper layers than the heat supplied at the upper part of the furnace. The use of turbulence-inducing nozzles in the bottom of the furnace also improves the heat distribution of the melt.

The separation of the grate ash to a coarse fraction having a particle size above say 50 mm and a fine fraction with a particle size of a maximum of 30 to 50 mm, facilitates the removal of scrap iron since this is present in an overproportional amount in the coarse fraction. This, in turn, ensures that large unmeltable pieces of iron will not collect on the bottom of the furnace and interfere with the withdrawal of the metal-enriched melt. The separation and particle size selection also simplifies the collection of the residue and the feed of the residues to the melting furnace.

The removal of iron scrap from the coarse fraction of the grate ash, e.g. through magnetic separation, and the feedback of a high proportion of the uncombusted contents of the coarse fraction following comminution to the boiler, ensures that another reusable product, namely, the iron scrap will be obtained.

The partial removal of metals, predominantly those with high vapor pressure, from the fly ash-before it is melted with the other residues prevents an enrichment of the metals by the evaporation in the melting furnace, in the incinerator. The removal of these metals from the filter dust can be effected by scrubbing with scrubbing water in the scrubber and recovers metals with high vapor pressure, like Cd and Zn with high efficiency.

By including in the residues which are melted not only the dry solids obtained in the manner described, but also moist solids from, for example, the treatment of the scrubbing water or waste water processing generally, substantially all of the residues obtained from the incineration system can be converted into the melts and thus into useful products.

The incorporation of scrap glass or sand as glass-forming agents in the residues introduced into the melting furnace, improves the quality of the glassy slag.

The apparatus of the invention can comprise an opening in the floor of the furnace and in the side wall thereof for separately withdrawing the two melts in a simple manner.

The heating of the upper part of the furnace is best effected by gas/oxygen burners while the heat contributed to the bottom part of the melt by electrodes extending into the melt, together with the turbulence-inducing nozzles in the bottom or floor of the furnace, ensures an effective distribution of the heat thereto.

For the separation of the grate ash into fine and coarse fractions, an oscillating sieve has proved to be highly effective and it has also been found to be advantageous to provide a vibrating conveyor for transfer of the combined residues from the bunker to the furnace.

A gate system along the ash pipe permits sealing of the fire box and facilitates dry de-ashing and a deflection chute can permit, upon standstill of the furnace, directing all of the grate ash which is produced into a temporary dry ash bunker. This greatly improves the operational reliability of the incinerator plant.

The branching also facilitates the separation of iron scrap and nonferrous metals from the system.

BRIEF DESCRIPTION OF THE DRAWING

The above and other objects, features and advantages of the present invention will become more readily apparent from the following description, reference being made to the accompanying drawing in which.

SPECIFIC DESCRIPTION

Example 1

Figure 1:
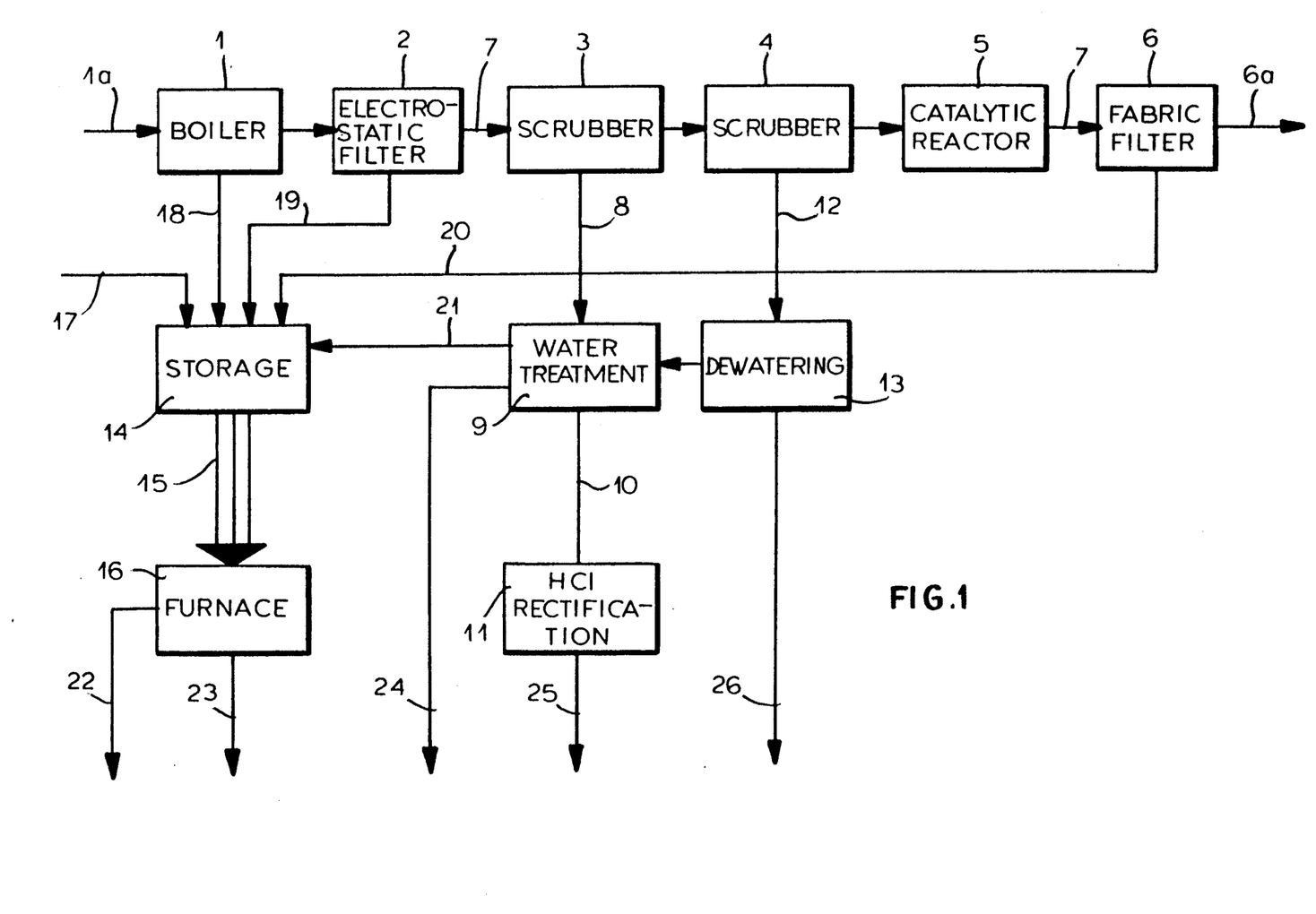
FIG. 1 is a simplified flow diagram of a garbage incinerator in accordance with a first example of the invention.

A garbage incinerator as illustrated in FIG. 1 can comprise a boiler 1, the flue gas of which is fed to a flue gas cleaning plant which, in turn, can be connected to a plant for the processing of residues from the flue gas cleaning. The residue treatment plant can also process ash from the boiler 1.

More specifically, the flue gas from boiler 1 can be fed to an electrostatic filter 2 and then to two scrubbers 3 and 4 before being supplied to a catalytic reactor 5 and discharged via a fabric filter 6 to the atmosphere via a stack represented at 6a. The elements 1-6 of the apparatus are connected by flue gas ducts represented generically at 7.

The flue gas cleaning apparatus also comprises a duct 8 connected to the first scrubber 3 and leading to a water treatment unit 9, residues from which are fed at 21 to the residue treatment unit 14, etc.

Similarly, a duct 12 connects the second scrubber 4 to a dewatering unit 13, the water of which undergoes water treatment at 9.

The unit or plant for the treatment of the residues comprises a supply bunker or bin 14, the solids of which are fed via a feed unit 15, which can be a screw type belt, vibrating or other conveyor, to a melting furnace 16. The latter may have the construction illustrated in FIG. 3 and described in connection with that Figure. The conveyor 15 connects the storage bunker 14, in which the residues are accumulated with the melting furnace 16.

For collection of the residues to be treated, a duct 17 opens into storage bin or bunker 14 for supplying glass-forming residues, like scrap, glass or sand, a duct 18 connects the boiler 1 with the bin or bunker 14 to deliver the grate and boiler ash to the bunker, the duct 19 connects the electrostatic filter 2 with the bunker 14 to deliver fly ash thereto, a duct 20 delivers dust collected on the cloth filter of unit 6 to the bunker, this dust being primarily the laden adsorbent, and a duct 21 carries moist solids from the water treatment stage to the bunker 14.

From the melting furnace 16, a line 22 carries off a residual melt while a line 23 carries away metal, enriched melt.

The waste water treatment stage 9 has a line 24 representing the removal of mercury and a line 10 delivering the water to an HCl rectification unit 11 having a line 25 for discharging hydrochloric (15 acid (HCl). The dewatering unit 13 has a line 26 for discharging gypsum ($CaSO_4$), the product formed by adding an absorbent like calcium oxide, calcium hydroxide or calcium carbonate to the scrubbing water.

In operation, the refuse fed to the boiler 1 at 1a is burned with the supply of air to the boiler grates and the steam or hot water produced is used for industrial, domestic heating or manufacturing purposes or for the generation of electricity.

The flue gas which results traverses the components 2-6 of the flue gas cleaner in succession. In the electrostatic filter 2, the fly ash is removed. Then in the first scrubber 3, HCl and HF are removed by scrubbing with water while in the second scrubber 4, with the addition of lime to the scrubbing water, sulfur dioxide is removed, thereby forming the gypsum.

Nitrogen oxides ($NO_x$) are removed in the catalytic reactor 5 and any residual contaminants are recovered in the fabric filter 6 which is provided with a filter layer. The filter layer can be formed by the addition of an adsorbent, such as a mixture of lime and activated carbon to the flue gas for entrainment on the fabric filter 6. This mixture can be produced upstream of the fabric filter 6.

While the scrubbing liquid can be recycled in both scrubbers, a portion of the scrubbing liquid is delivered at 8 to the water treatment stage 9 in which, by ion exchange, any mercury is removed and discharged at 24. An HCl enriched stream is fed at 10 to the HCl rectification unit 11 which feeds a commercial concentration of HCl, for example, 30% hydrochloric acid, from the system at 25.

The gypsum-containing scrubbing water from the scrubber 4 is dewatered at 13 and the gypsum is discharged at 26 for use in the fabrication, for example, of plasterboard or for conversion to plaster of paris or for any other conventional industrial or commercial use. The filtrate resulting from the dewatering, if any, is fed to the water-treatment stage 9.

The residues are collected at 14 and have as a result of the dewatering and prior treatment, a moisture content between 30% and 90% where dewatering is required.

As has previously been indicated, apart from the grate ash and boiler ash from the boiler 1 fed via line 18 and the fly ash from the electrofilter 2 fed via line 19 with practically zero moisture content, glass-forming residues like scrap glass or sand are fed via line 17 to the bunker 14 together with laden adsorbent and the moist residue from the water-treatment stage 21.

The collected residues are fed together to the melting furnace 16 via the feeder 15.

In the melting furnace 16 in which the melting bath temperature is 1300° to 1500° C., the residues are melted at a temperature of 100° to 300° C. above the melting bath temperature in the region above the melt. The residence time of the residues in the melting bath is 5 to 24 hours normally, but can be longer as necessary where the supply of the residues is diminished or is interrupted.

From the melting furnace 16, a residual melt is withdrawn via line 22 and a metal-enriched melt is tapped via line 23. The residual melt forms, after cooling, a completely glass-like slag from which, however, not only noncombusted carbon and halogenated carbon contents, but also sulfur, chlorine and metals and metal compounds have been substantially completely removed.

Figure 2:
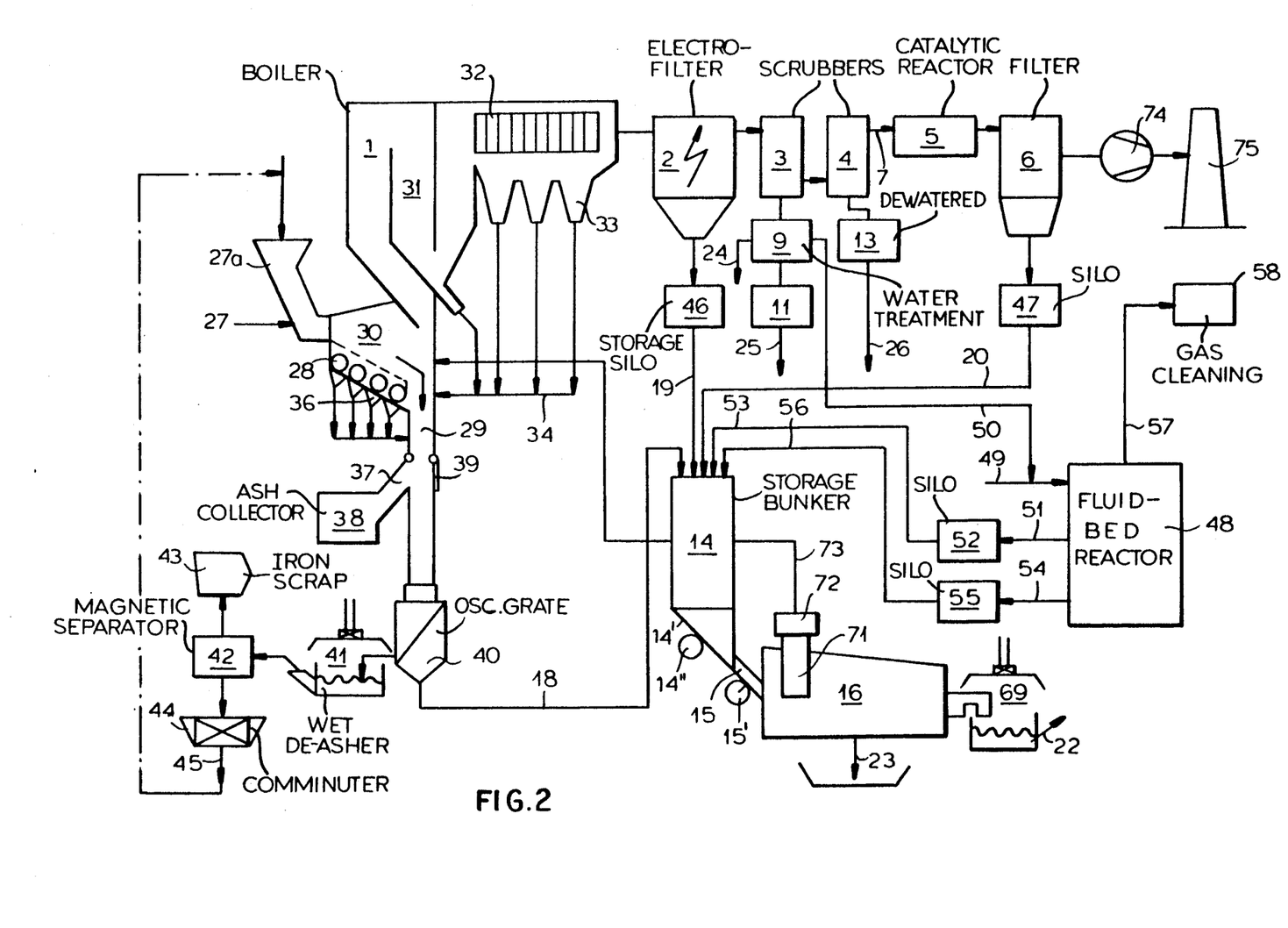
FIG. 2 is a flow diagram of the incinerator in accordance with a second example thereof.
Figure 3:
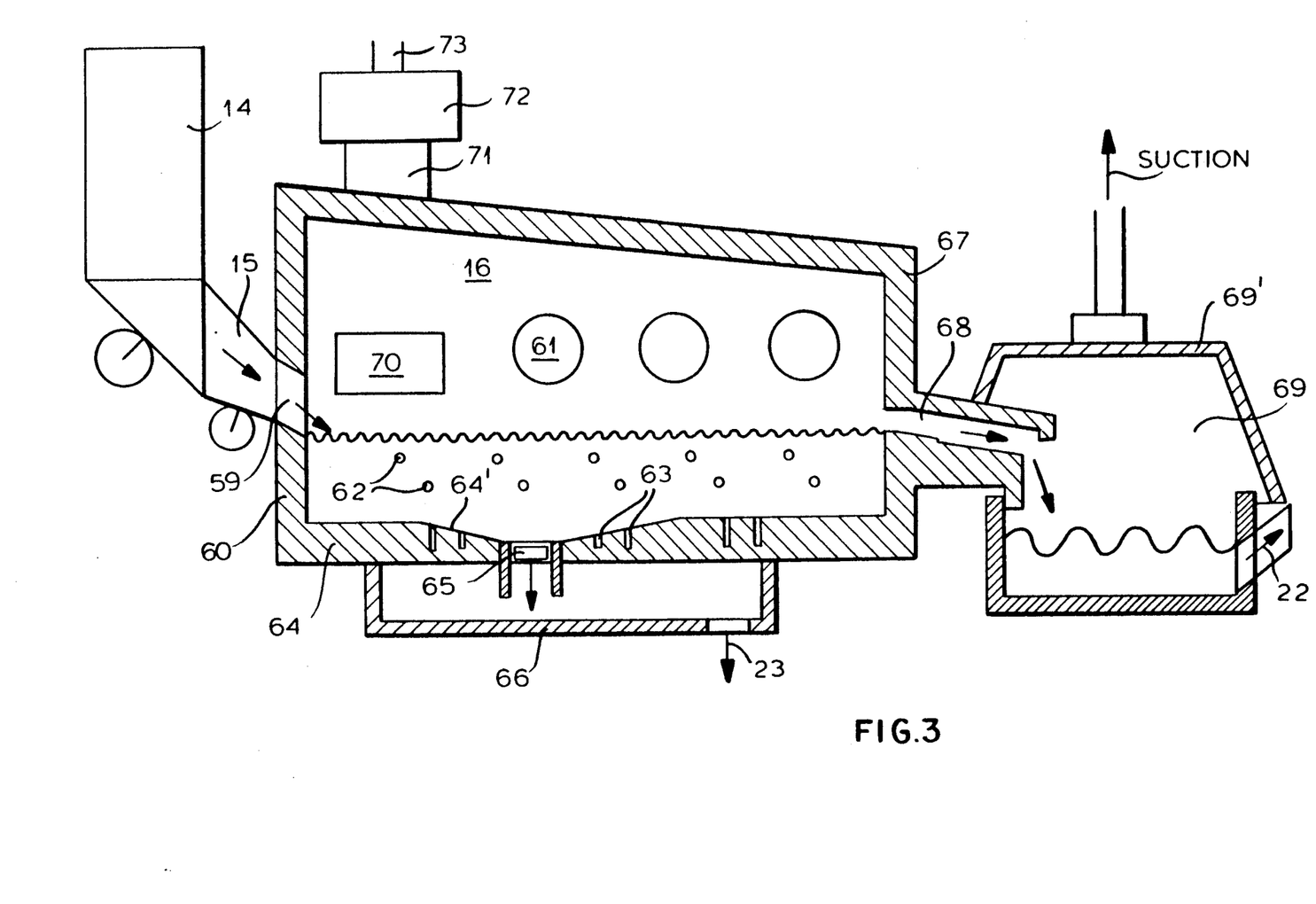
FIG. 3 is a vertical cross section through the melting furnace for the processing of the incineration residue.

Example 2 (FIGS. 2 and 3)

This example is directed primarily to the treatment of the residues. The garbage incinerator of FIG. 2 has the same components as in Example 1 but differs in that the waste-water treatment unit 9 is not connected with the storage bunker 14. In this embodiment, the boiler 1 is provided with a unit 27 for feeding the refuse or garbage to the boiler. This unit 27 comprises a hopper 27a leading to a roller grate 28 having four to six rollers, and an ash shaft 29 with a combustion chamber 30 thereabove. A flue gas outlet is represented at 31 and the water tubes of the boiler may line or form the walls thereof in a manner not illustrated in FIG. 2.

The tube bundles may also be provided at 32 in the flue gas path through the boiler. The flue gas outlet stage 31 can have collecting hoppers 33 for the boiler ash and these hoppers may have ducts 34 delivering the collected boiler ash to the ash shaft 29.

The ash shaft 29 begins laterally of the last roller of the grate 28 and extends downwardly. It extends horizontally also to full length of the rollers 28. In the ash shaft 29, a conveyor duct 35 opens below the roller grate and is connected to the hoppers 36 for the grate residues or ash, thereby delivering these residues to the ash shaft as well. Below this connection, the ash shaft 29 can be provided with a gas-tight gate system (not shown) if desired.

From the ash shaft 29 below this gate system, another ash shaft 37 is branched to open into a dry de-asher 38 which can also form an ash bin or bunker.

At the level of this branch, a motor-driven swingable gate 29 is provided and in its inwardly swung position can close the ash shaft 29 and deposit the grate ash via the shaft branch 37 in the de-asher.

At the outlet of the ash shaft 29, an oscillating sieve 40 with a mesh width of 40 mm is provided. The coarse outlet is connected with a wet de-asher 41 with mist evacuation while the fine outlet is connected via duct 18 to the bunker 14.

The output from the wet de-asher 41 is connected via a magnetic separator 42, e.g. a belt conveyor with an overlying magnetic belt pickup. The magnetic separator 42 is provided with a scrap-iron container 43 and a comminuter 44 for the nonmagnetic coarse fraction with a duct 45 which can return the nonmagnetic coarse fraction to the unit 27 feeding the refuse to the incinerator.

In the duct 19 which connects the electric filter 2 with the bunker 14, there is provided a storage silo 46.

Similarly, in the duct 20, which connects the fabric filter 6 with the bunker 14, a silo 47 is provided.

The garbage incinerator of this example is associated with a sludge-burning plant which is intended for the destruction of sewage sludge obtained from sewage treatment by any conventional digestion technique. The sludge-burning plant comprises a fluidized bed reactor 48 supplied with the sewage sludge through a feed line 49. A duct 50 opening into the duct 49 supplies the solids recovered from the water-treatment unit 9. The effluent of that unit is discharged at 24 and can correspond to the effluent of the water treatment discharged at 24 in FIG. 1.

An ash-discharge line 51 carries the ash from the fluidized-bed reactor to a silo 52 which communicates via line 53 with the sewage bunker 14.

The fluidized bed is maintained with sand in the reactor 48, a sand-discharge line 54 from the fluid bed reactor 48 can feed the silo 55 which is connected via a line 56 with the supply bunker 14. In this case the sand is a glass-forming component as supplied to the bunker 14.

The flue gas duct 57 from this reactor 48 leads to a gas-cleaning unit 58 which can include filters and scrubbers as described and can communicate, in turn, with the blower 74 and the stack 75.

The bunker 14 which forms a supply bin or hopper for the furnace 16, can be vertically oriented and can have a rectangular horizontal cross section. The bottom 14' of this hopper can be inclined downwardly toward the inlet or feed machine 15 and can be provided with a vibration unit 14" to vibrate the bottom and thus allow the solids to trickle onto the feeder 15. The latter may have a vibrator 15' and may be a feed table which is water cooled, is inclined to extend the inclination of the bottom of the hopper and can open through an opening 59 in the side wall 60 of the furnace 16 (see FIG. 3).

The melting furnace 16 is a so-called tub or tank melting furnace whose thermally-insulated housing has a rectangular horizontal cross section and approximately rectangular vertical cross section with the roof of this furnace being inclined slightly downwardly away from the side wall 16.

At the upper third of the melting chamber of this furnace, i.e. the interior of the melting furnace 16, there are two to ten water-cooled gas/oxygen burners 61 operated with methane (natural gas) with the fuel.

In this example, three burners are provided between the longitudinal walls which extend perpendicular to the side wall 60. From these longitudinal walls, two to thirty molybdenum electrodes 62 project into the melting chamber in the lower third thereof to supply the electrical energy required for melting. The number of these molybdenum electrodes will be determined by the desired energy supply.

In addition, fluidizing nozzles 63 open into the melt at the bottom 64 of the furnace 16 to provide agitation of the melt and the content of the melting furnace.

In the half of the furnace bounded by the side wall 60, the floor of the furnace is provided with a generally funnel-shaped trough 64' at the center of which a closable outlet 65 is formed. In the flanks of this trough, fluidizing nozzles 63 are also provided.

Beneath the outlet 65, we have disposed a collecting device 66 in the form of a cooled plate which communicates with a duct 63 for leading away the metal-enriched melt.

On a side wall 67 opposite the side wall 60, we provide an outlet 68 to allow the residual melt or slag forming mass to be drawn off. This relatively short outlet opens into a water bath 69 provided with a mist collector 69' and duct 22 for discharging the slag.

Between side wall 60 and the burner 61, the two longitudinal walls opposite one another are provided with openings 70 communicating with exhaust gas ducts which feed the exhaust gas into a collecting duct 71 (FIG. 2). From the collecting duct 71, the exhaust gas is fed via duct 73 to the combustion chamber 30 of the boiler 1.

In FIG. 2 it is also apparent that the components of the flue gas cleaner are connected to a suction blower 74 and the stack or chimney 75.

In a variant of Example 2, in the duct 19 from the electrostatic filter 2, a scrubber can be provided for the removal of metals, preferably with high vapor pressure, from the flue ash.

Instead of an oscillating sieve 40, we can employ a grate with a mesh width of 30 to 50 mm.

Instead of the burners 61 supplied with fuel and oxygen, we can operate with air-fed burners.

In operation, the refuse is supplied through the feed unit 27 and falls on the roller grate 28, the ash being delivered to the shaft 29 while the combustibles are burned in the chamber 30 with the addition of air.

The resulting flue gas rises through the combustion chamber 30 into the flue gas outlet section 31 of the boiler and then passes via the flue gas ducts 7 initially through the electrostatic filter 2 and then through the scrubbers 3 and 4, the catalytic reactor 5, the fabric filter 6 and the suction blower 74 to the stack 75. The gas-cleaning elements in this embodiment operate similarly to those described in connection with FIG. 1.

A portion of the solid residue entrained in the flue gas is collected in the hoppers 33 as boiler ash and fed via line 34 to the ash shaft 29.

The ash shaft 29 also collects the grate ash and the residues which pass over the last roller of the grate as well as the ash passing through the grate, collected in the hoppers 36 and fed at line 35 to the ash shaft 29.

Thus grate ash and boiler ash are separated into coarse and fine fractions by the oscillating grate 40.

The component with a particle size greater than 40 mm is passed initially through the wet de-asher 41 and after cooling to the magnetic separator 42, the iron components are collected as iron scrap in the container 43 and the residual coarse fraction is comminuted and recycled to the feeder as represented at 45.

The fines of the grate and boiler ash are supplied via duct 18 to the storage bunker 14.

In addition, the filter dust from the fly ash filter 2, optionally partially freed from metals, is supplied at 19 to the bunker 14 which also receives the charged adsorbent from the line 22 deriving from filter 6. The ash from the fluid bed reactor is supplied via line 53 and sand from the fluid bed reactor 48 is supplied via the line 56 to the bunker 14.

From the bunker 14, the feeder 15 supplies the mixed residues to the melting chamber of the melting furnace.

The melting furnace 16 can be directly heated by the e.g. six natural-gas-fired oxygen burners 61. The flue gas from this combustion is collected in ducts 71 and 72 and carried by duct 73 directly to the combustion chamber 30.

The residue is melted continuously at a temperature of about 1400° C. The residence time in the melt bath amounts to about 12 hours.

During the melting, unburned carbon and halogenated hydrocarbons are decomposed and/or burned. The residual melt is drawn off through the outlet 68 and is granulated in the water bath 69. It yields a glassy slag free from any undesirable components and in which any toxic or noxious substances are bound in a glass matrix. This product can be used in landscaping and construction as a filler or aggregate or the like and can be deposited in a landfill or depleted mine without the danger of leaching therefrom. During the melting, the volume of the residue is reduced by about 70 to 80%.

The molten and solid metals sink to the bottom 64 of the furnace 16 so that a metal-enriched melt is drawn off through the outlet 65, usually discontinuously, can be cooled and can be subjected to processing for recovery of the various metals.

The treatment of the residue in accordance with the invention enables the incinerator to be operated with practically no residue and with the production of products which can be reused or commercially marketed, including gypsum, hydrochloric acid and mercury, as well as scrap iron, metal slag and glassy slag.

Figure 4:
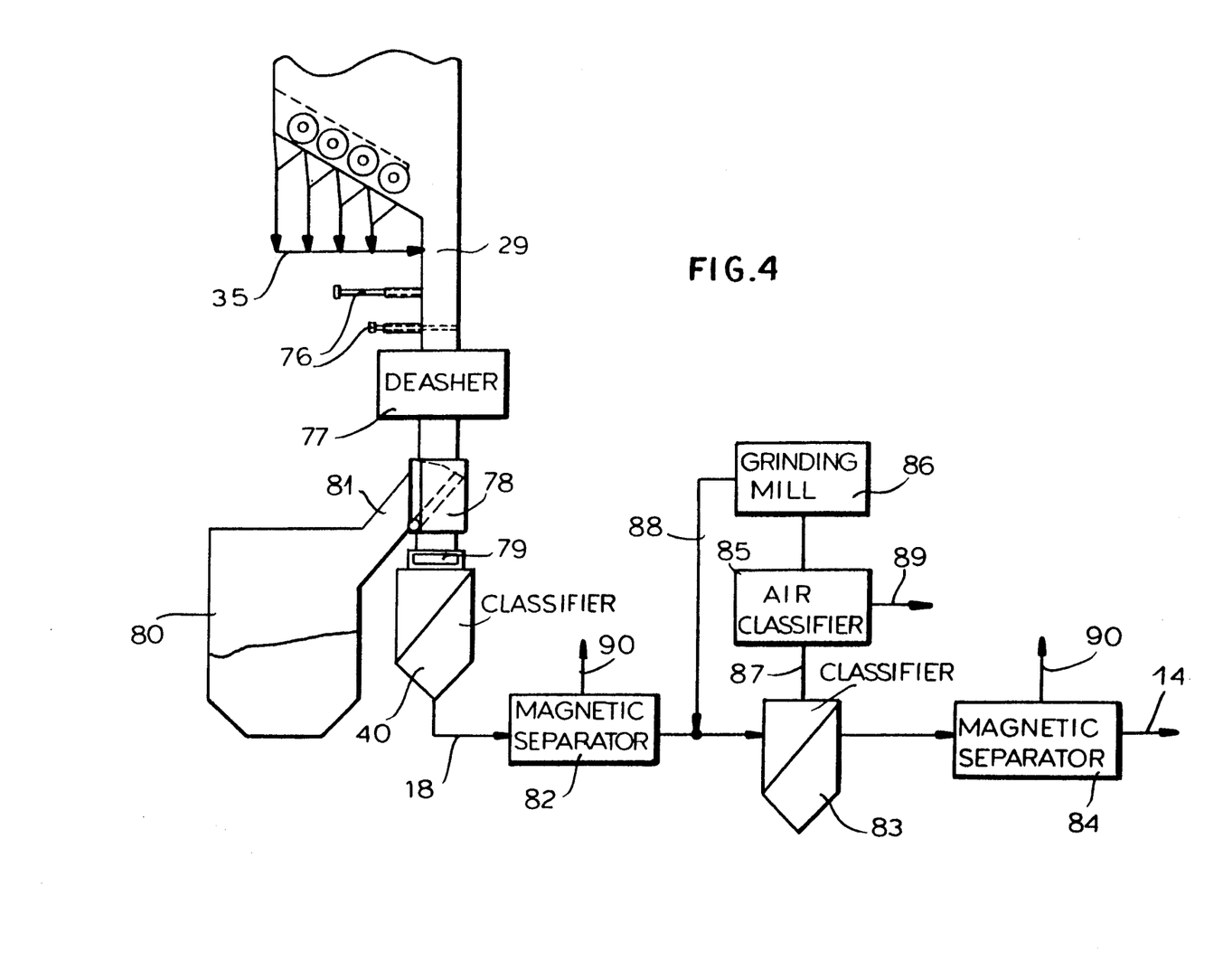
FIG. 4 is a flow diagram illustrating a portion of the incinerator apparatus of Example 3.

Example 3 (FIG. 4)

The incinerator of Example 3 (FIG. 4) differs from that of Example 2 in the following points:

In the ash shaft 29, below the duct 35 delivering the grate ash to this ash, a gate system is formed by two closure sliders 76 sealingly engaged with the shaft, vertically-spaced apart and adapted to be slid across the shaft to hermetically seal the latter. In the closed state, each of the sliders blocks the entire cross section of the shaft 29 and closes it in a gas-tight manner. In the positions shown in FIG. 4, the upper slider 76 is open and the lower slider is closed.

Below the gate system the ash shaft 29 is provided with a dry de-asher 77 and below the de-asher 77, the ash shaft opens into a device 78 with a deflection chute to which the oscillating sieve classifier 40 is connected by a conveyor, for example, a belt conveyor 79. The chute alternatively delivers the ash to a dry ash bunker via a conveyor device 81, e.g. a duct. The ash bunker 80 can also be directly connected to the ash shaft 29 so that neither a conveyor nor a duct is required.

To improve the quality of the slag formed in the melting furnace 16, the fines which are separated by the oscillating sieve 40 and fed to the supply bunker 14 can be subjected to additional treatment. In this case, a magnetic separator 82 can be provided for the fines and the collected iron scrap delivered to an iron container represented at 90.

Following the magnetic separator 82 is a further classifier 83 which can also operate with an oscillating sieve and can have a mesh width of 2 to 8 mm and can be followed by a further magnetic separator 84 communicating with the iron collector 90, the fines pass into the supply bunker 14.

The coarse particles traverse a fluidizing or air classifier 85 and are comminuted in 86, e.g. in an impact mill, the milled product being returned at 88 to the classifier 83.

The particles may be conveyed in this system by conveyor belts if desired. The classifier 85 may have a container 89 for collecting nonferrous metals.

In the operation of this system, the deflection chute 78 can be opened to allow the residues to pass through the gate system formed by the solids 76 to the de-asher 77 and via the conveyor 79 to the oscillating sieve 40.

The residue free from the coarse fraction is subjected to magnetic separation at 82 to remove iron scrap which is collected in container 90. The coarse phase from classifier 83 is subjected to air classification at 85 and the nonferrous metal removed to the container 89 while the residual coarse fraction is comminuted at 86 and returned to the classifier 83. The fines which ultimately pass this classifier are again subjected to magnetic separation at 84 at which additional quantities of iron scrap are removed to the container 90. In a system in which a wet de-asher is employed, in the path 18 an additional drier may be required, preferably downstream of the separator 82 before the conveyor 88 opens into this path.

We claim:

1. A method of operating a garbage and refuse incinerator which comprises the steps of:
   (a) incinerating garbage to produce a grate ash cast off from an incinerator grate, a boiler ash recovered from flue gas passages and fly ash entrained with a flue gas of the incinerating garbage;
   (b) recovering said fly ash from said flue gas from incineration of the garbage in step (a);
   (c) collecting said grate ash and said boiler ash from the incineration in step (a) and said fly ash from the recovery from said flue gas in step (b) to form mixed residues of collected grate ash, boiler as and fly ash;
   (d) melting mixed residues including the collected grate ash, boiler ash and fly ash of step (c) in a melting furnace by supplying energy thereto, thereby forming a metal-enriched melt in said furnace and a residual melt therein; and
   (e) separately withdrawing said residual melt and said metal-enriched melt from said furnace and cooling same, a melt bath being maintained at a temperature of 1100° C. to 1500° C. in said furnace, above said melt bath a temperature 100° C. to 300° C. higher than that of the melt bath being maintained in said furnace; and
   (f) additionally heating a lower portion of said bath.

2. The method defined in claim 1 wherein said furnace has a bottom and a side wall formed with an outlet, said metal-enrichment melt being tapped from said furnace through the bottom thereof and said residual melt being withdrawn from said outlet formed in said side wall of said furnace.

3. The method defined in claim 1 wherein said metal-enriched melt is tapped discontinuously from said furnace and said residual melt is withdrawn continuously from said furnace.

4. The method defined in claim 1, further comprising the step of introducing air into said lower portion of said bath to induce turbulence therein.

5. The method defined in claim 1 wherein said fly ash includes metals having a high vapor pressure, further comprising the step of at least partly removing from the fly ash recovered in step (b) metals having a high vapor pressure, before melting said fly ash in step (d).

6. The method defined in claim 1 wherein the mixed residues melted in step (d) include moist residue including a waste-water-treatment residue, in addition to dry residues.

7. The method defined in claim 1, further comprising incorporating in said mixed residues scrap glass or sand.

8. A method of operating a garbage and refuse incinerator which comprises the steps of:
   (a) incinerating garbage to produce a grate ash cast off from an incinerator grate, a boiler ash recovered from flue gas passages and fly ash entrained with a flue gas of the incinerating garbage;
   (b) recovering said fly ash from said flue gas from incineration of the garbage in step (a);
   (c) collecting said grate ash and said boiler ash from the incineration in step (a) and said fly ash from the recovery from said flue gas in step (b) to form mixed residues of collected grate ash, boiler ash and fly ash;
   (d) melting mixed residues including the collected grate ash, boiler ash and fly ash to step (c) in a melting furnace by supplying energy thereto, thereby forming a metal-enriched melt in said furnace and a residual melt therein; and
   (e) separately withdrawing said residual melt and said metal-enriched melt from said furnace and cooling same,
   (f) separating said grate ash into a fine fraction having a maximum particle size in a range of 30 to 50 mm and into a coarse fraction having a larger particle size, said fine fraction being melted in said furnace in step (d).

9. The method defined in claim 8 wherein said coarse fraction contains iron, further comprising the steps of:
   subjecting said coarse fraction to magnetic separation to remove iron therefrom; and
   thereafter comminuting said coarse fraction to form a comminuted coarse fraction and feeding the comminuted coarse fraction to a boiler in which said garbage is incinerated in step (a).

10. An apparatus for incinerating garbage, comprising:
    a boiler formed with a combustion chamber having flue gas cleaning passages at which boiler ash is formed, a grate adapted to receive garbage to be incinerated and on which grate ash is formed, and means for incinerating the garbage to produce a flue gas in which fly ash is entrained;
    flue-gas cleaning means connected to said boiler, receiving said flue gas from said boiler and recovering fly ash from said flue gas whereby said fly ash, grate ash and boiler ash form mild residues;
    means for collecting mixed residues including said grate ash and said boiler ash from said boiler and said fly ash from said flue-gas cleaning means;
    a furnace separate from said boiler and said means for collecting, but connected to said means for collecting, for melting said mixed residues, thereby forming a metal-enriched melt in said furnace and a residual melt in said furnace, said furnace being provided with an outlet for discharging said metal-enriched melt and an opening for discharging said residual melt, said outlet being formed in a bottom of said furnace and said opening in a side wall thereof;
    two to ten natural gas fired oxygen burners in an upper third of said furnace; and
    auxiliary heating means for electrically heating a lower portion of a melt in said furnace.

11. The apparatus defined in claim 10 wherein said auxiliary heating means includes a plurality of electrodes disposed at a lower portion of a melt chamber of said furnace.

12. The apparatus defined in claim 10, further comprising nozzles formed in a bottom of said furnace for inducing turbulence in a melt therein.

13. The apparatus defined in claim 10 wherein said boiler has an ash shaft receiving said grate ash and provided with a separator for separating said grate ash into a fine fraction having a maximum particle size in a range of 30 to 50 mm and a coarse fraction having a larger particle size.

14. The apparatus defined in claim 13 wherein said separator is an oscillating sieve particle size classifier.

15. The apparatus defined in claim 10 wherein said means for collecting comprises a collecting bunker and a feed conveyor connecting said collecting bunker with said furnace.

16. The apparatus defined in claim 15 wherein said feed conveyor is a water-cooled conveyor table extending from said bunker to said furnace.

17. The apparatus defined in claim 13 wherein said shaft is provided with a gate system having two shaft-blocking sliders disposed one above another and forming gas-tight engagements with said shaft.

18. The apparatus defined in claim 13, further comprising a dry deasher for ash recovery branched from said shaft and a guide gate along said shaft at the branching of said dry deasher therewith.

19. The apparatus defined in claim 13, further comprising a dry deasher for ash recovery branched from said shaft and a deflection chute downstream thereof.

* * * * *